US007822843B2

(12) United States Patent
Perdon et al.

(10) Patent No.: US 7,822,843 B2
(45) Date of Patent: Oct. 26, 2010

(54) PREDICTING THE ACTIVITIES OF AN INDIVIDUAL OR GROUP USING MINIMAL INFORMATION

(75) Inventors: Albert Honey Perdon, Cerritos, CA (US); Anthony Scott Oddo, Jamaica Plain, MA (US)

(73) Assignee: Cox Communications, Inc., Atlanta, GA (US)

( * ) Notice: Subject to any disclaimer, the term of this patent is extended or adjusted under 35 U.S.C. 154(b) by 902 days.

(21) Appl. No.: 09/928,493

(22) Filed: Aug. 13, 2001

(65) Prior Publication Data

US 2003/0033405 A1 Feb. 13, 2003

(51) Int. Cl.
*G06F 15/173* (2006.01)
(52) U.S. Cl. .......................... 709/224; 709/219; 710/10
(58) Field of Classification Search ................. 709/224, 709/219; 707/10; 710/10
See application file for complete search history.

(56) References Cited

U.S. PATENT DOCUMENTS

| | | | | |
|---|---|---|---|---|
| 5,347,632 | A | 9/1994 | Filepp et al. ................ | 395/200 |
| 5,572,643 | A | 11/1996 | Judson ........................ | 395/793 |
| 5,740,549 | A | 4/1998 | Reilly et al. .................. | 705/14 |
| 5,754,774 | A | 5/1998 | Bittinger et al. ........ | 395/200.33 |
| 5,761,662 | A | 6/1998 | Dasan ......................... | 707/10 |
| 5,794,210 | A | 8/1998 | Goldhaber et al. ............ | 705/14 |
| 5,812,784 | A | 9/1998 | Watson et al. .......... | 395/200.57 |
| 5,913,040 | A | 6/1999 | Rakavy et al. ......... | 395/200.62 |
| 5,946,646 | A | 8/1999 | Schiena et al. .............. | 702/177 |
| 5,959,623 | A | 9/1999 | van Hoff et al. ............. | 345/333 |
| 5,987,442 | A * | 11/1999 | Lewis et al. .................... | 706/10 |
| 6,012,051 | A | 1/2000 | Sammon, Jr. et al. ......... | 706/52 |
| 6,014,638 | A | 1/2000 | Burge et al. ................... | 705/27 |
| 6,026,368 | A | 2/2000 | Brown et al. .................. | 705/14 |
| 6,029,195 | A * | 2/2000 | Herz ........................... | 725/116 |
| 6,049,777 | A | 4/2000 | Sheena et al. ................. | 705/10 |
| 6,055,569 | A | 4/2000 | O'Brien et al. | |
| 6,134,532 | A | 10/2000 | Lazarus et al. ................ | 705/14 |
| 6,157,946 | A | 12/2000 | Itakura et al. ............... | 709/217 |
| 6,163,316 | A | 12/2000 | Killian | |
| 6,177,931 | B1 | 1/2001 | Alexander et al. | |

(Continued)

FOREIGN PATENT DOCUMENTS

WO        WO 00/49801        8/2000

*Primary Examiner*—Ario Etienne
*Assistant Examiner*—El Hadji Sall
(74) *Attorney, Agent, or Firm*—Merchant & Gould

(57) ABSTRACT

A method and system are provided for predicting the behavior of an individual, e.g., one engaged in an on-line session, based on a comparison of the individual's activities during that session with those participated in by multiple other parties. The individual's activities during the session and certain attendant conditions are monitored and compared with a continually updated database that reflects (a) the cumulative activities of all other parties and their attendant conditions and (b) behavioral trends exhibited by those other parties based on their participation in various types of activities under various conditions. When similarities are detected between the individual's activities and their attendant conditions and those of certain other parties, the corresponding behavioral trend of those other parties is attributed to the individual. The method and system are implemented in connection with an interactive service, for example, in an Internet environment, wherein the prediction of behavior involves identifying web sites that are likely to be visited by the individual. This prediction can be used to initiate the delivery of informational content targeted to that individual.

37 Claims, 4 Drawing Sheets

U.S. PATENT DOCUMENTS

| | | | |
|---|---|---|---|
| 6,236,978 B1 | 5/2001 | Tuzhilin | 705/26 |
| 6,338,066 B1 * | 1/2002 | Martin et al. | 707/10 |
| 6,453,265 B1 | 9/2002 | Dekhil et al. | |
| 6,708,335 B1 * | 3/2004 | Ozer et al. | 725/20 |
| 6,779,119 B1 * | 8/2004 | Moshfeghi et al. | 713/201 |
| 6,819,669 B2 * | 11/2004 | Rooney | 370/390 |
| 2001/0034637 A1 | 10/2001 | Lin et al. | |
| 2001/0049620 A1 | 12/2001 | Blasko | |
| 2002/0174134 A1 * | 11/2002 | Goykhman | 707/104.1 |
| 2002/0188507 A1 | 12/2002 | Busche | |
| 2002/0188717 A1 | 12/2002 | Mushlin et al. | |

* cited by examiner

PREDICTING THE ACTIVITIES OF AN INDIVIDUAL OR GROUP USING MINIMAL INFORMATION

BACKGROUND OF THE INVENTION

1. Field of the Invention

The present invention relates to a method and system for predicting the future behavior of an individual or group engaged in a particular type of activity when there is little or no information on previous behavior of that specific individual or group under comparable conditions.

2. Description of Related Art

An age-old question faced by advertising and marketing professionals is how to ensure that their advertising and marketing materials reach the largest possible audience that is favorably disposed to purchase the products or services being promoted, so as to maximize the effectiveness of an advertising campaign. Clearly, advertising via mass media, such as in newspapers and magazines having wide circulation or on network television programming, will cause the message to be delivered to the largest number of consumers in the shortest possible period of time. However, it is very likely that only a miniscule percentage of the persons to whom these materials are exposed at any given time would be attentive to the contained message or would be in the market for the product or service in question, at the exact moment of exposure. Therefore, such approaches are both inefficient and costly, since the cost is generally based on the number of persons to whom the advertising will be delivered, irrespective of their potential interest.

Clearly, a more targeted approach would be more cost-efficient, i.e., one that is limited only to consumers who are likely to be favorably predisposed to the products or services being promoted. Although the marketing messages would be viewed by fewer persons, yet, from a statistical perspective, a higher percentage of those persons would be likely to be induced to take positive action in response to that message. This results in a markedly more effective use of an advertising budget. A consumer's perceived predisposition could be based, for example, on his/her: being a member of a particular socio-economic class; having a relevant occupation or hobby; living in a certain geographic area; having a family of a certain size; being a graduate of a particular type of school; having a certain ethnic background; subscribing to certain periodicals; or having bought similar products or services in the recent past.

Therefore, over the years, retailers and their advertising affiliates have spent considerable time and money in acquiring, analyzing and categorizing information from millions of individual consumers. Information is acquired using traditional methods such as in-person and telephone surveys, and, in more recent years, through more sophisticated methods such as monitoring use of customer "loyalty cards" in connection with purchases, and monitoring web-surfing activity over various on-line services that access the Internet using "cookies" or comparable data-gathering mechanisms. Through well-known statistical and probability-based modeling techniques, this archive of pertinent information can be analyzed and processed in various ways to identify an individual consumer's preferences or predispositions to become engaged in certain types of activities. By comparing information collected from individuals sharing common attributes, group preferences or predispositions similarly can be established.

This information then can be used to deliver targeted advertising content to those individual consumers, or similarly oriented groups of consumers, who are most likely to be influenced by the advertising message, whether by means of traditional direct mailings, telemarketing programs, or real-time banner advertisements visible on a computer monitor screen during a particular user's on-line surfing activities, or television ads received during the normal broadcast or during interactive sessions. This results in a more systematic, more controlled delivery of content over the life span of a particular advertising campaign.

However, to date relatively little, if any, targeted content delivery could be made to a given individual unless a meaningful amount of data on that individual's past activity, within a particular environment or setting, had been compiled. This is especially a problem in the case of on-line delivery of advertising messages, e.g., when the user is visiting a specific Internet web site, since there is a relatively limited window of opportunity during which to reach the on-line user before he/she either leaves the web site in question to visit another web site, or logs off entirely from the on-line service that provides the access to the web sites. If a person is a first-time visitor to a particular on-line environment (e.g., a particular web site), and if there is no past history of either how that person is known to act within that environment, or how that person reacts to situations that are typical of those found in that environment, then targeted content delivery, if attempted at all, would need to be based on broad assumptions that may not in fact be applicable to that person. Some reports estimate that as many as 80% of all visitors to a web site are "unknown" to that web site, i.e., the web site has no data whatsoever on those visitors.

Therefore, it would be desirable to provide a technique by which to identify tendencies or preferences of a particular user of an information delivery service, based on similarities between the user's present activities in connection with that service and the characteristics exhibited by other users of the same or similar information delivery services.

It would also be desirable to use the identified tendencies or preferences to anticipate or predict the user's future behavior in connection with the information delivery service.

It would also be desirable to use the identified tendencies or preferences to deliver targeted informational content to the user based on the identified tendencies or preferences.

BRIEF SUMMARY OF THE INVENTION

One embodiment of the present invention is directed to a technique for predicting the behavior of a current user of an interactive service. Each activity in which the current user participates while engaged with the interactive service is identified, as well as the conditions surrounding each activity. A first collection of data is accessed that reflects (i) cumulative activities in which other users have participated, (ii) conditions surrounding the other users' cumulative activities, and (iii) patterns of behavior exhibited by the other users derived from their participation in such cumulative activities. The current user's identified activities and surrounding conditions are compared with the other users' cumulative activities and surrounding conditions, to identify similarities. Finally, a pattern of future behavior is attributed to the current user, based on the identified similarities and on the other users' patterns of behavior.

In another embodiment of the invention, additionally there is a second collection of data that reflects (i) the types of activities (e.g., categorized by informational content) that are available via the interactive service and (ii) information about each type of activity that distinguishes it from other types of activities. The embodiment attributes a pattern of behavior to the current user by selecting one or more types of activities from the list of all available types of activities, as being the one(s) in which the current user is most likely to participate during his/her engagement with the interactive service.

In further embodiment of the invention, the behavior of a user of an interactive service can be predicted during a particular period of engagement with that interactive service, even in the absence of a pre-existing collection of data reflecting the cumulative activities of multiple other prior users. This embodiment (a) identifies activities, or types of activities, in which the user participates during that period of engagement and the conditions surrounding each such activity (b) identifies activities, or types of activities, in which other users contemporaneously participate during the same period of engagement and the conditions surrounding each such activity and (c) compiles in real time a collection of data that reflects the cumulative activities of the other users and their surrounding conditions. Then, patterns of behavior are discerned, in real time and on an ongoing basis, from this expanding and evolving collection of data, and data reflecting these patterns of behavior are incorporated into the collection of data. A comparison is made between (i) the user's present activities and surrounding conditions and (ii) the collection of data, to identify similarities. Finally, there is attributed to the user a pattern of future behavior based on such similarities and on the previously determined patterns of behavior.

Based on these predictions of behavior, targeted informational content can then be delivered to the user, or to groups of similarly oriented users, that is relevant to the user's perceived areas of interest.

Embodiments of the invention are based in part on the recognition that people in general behave in very predictable manners. Their activities follow patterns that are easily discernable from one another. Learning how to identify the attributes of a particular pattern allows one to forecast with a high degree of certainty what an individual's next action is likely to be. For example, in the case of visits to Internet web sites, it is generally known that most users participate in only a limited number of activities while on the Web and that they participate in only one activity at a time. Also, a typical user will generally spend a certain amount of time on that one activity before moving on to another activity. Certain groups of people will behave the same with regard to the sequence in which they move from one activity to another and to the amount of time participating in each activity. These are the emerging set of patterns of behaviors across users that can be used to compare to an individual user, even if he/she is relatively unknown.

These and other features of various embodiments of the present invention will become readily apparent from the following detailed description, to be read in conjunction with the appended drawings. The description and drawings are intended to be merely illustrative in nature, and not to restrict or limit the scope of the invention as defined by the claims.

DETAILED DESCRIPTION OF PREFERRED EMBODIMENTS

The present invention is directed to predicting the probable or likely behavior of an individual person (or a group of persons who are related according to certain criteria) interacting with an information access service, based primarily on the behavioral traits or preferences demonstrated by other persons (or other groups) who have transacted with that same or a similar service, as opposed to being based exclusively on observations of, and analysis of, historical actions of the specific individual (or specific group) being monitored. In a specific embodiment that operates in an Internet-based environment, the types of Internet web sites that the user in question is most likely to subsequently visit can be determined during a particular session of web-surfing and the amount of time that the user is likely to spend at such web sites.

Embodiments of the invention are particularly useful in conjunction with a targeted content delivery system, which allows the web site to present to the individual user being observed advertisements, promotional messages or other informational content that is relevant to the predicted behavior of that user, and to which that user is most likely to be responsive. An example of such a targeted content delivery system is the one disclosed in U.S. patent application Ser. No. 09/558,755 filed Apr. 21, 2000 in the name of the assignee of the present application, entitled "Method and System for Web User Profiling and Selective Content Delivery", and which is incorporated herein by reference. Such a content delivery system can be configured to initiate a content delivery in response to the user's behavioral pattern or to his/her tendencies or traits, as determined in accordance with the present invention.

Figure 1:
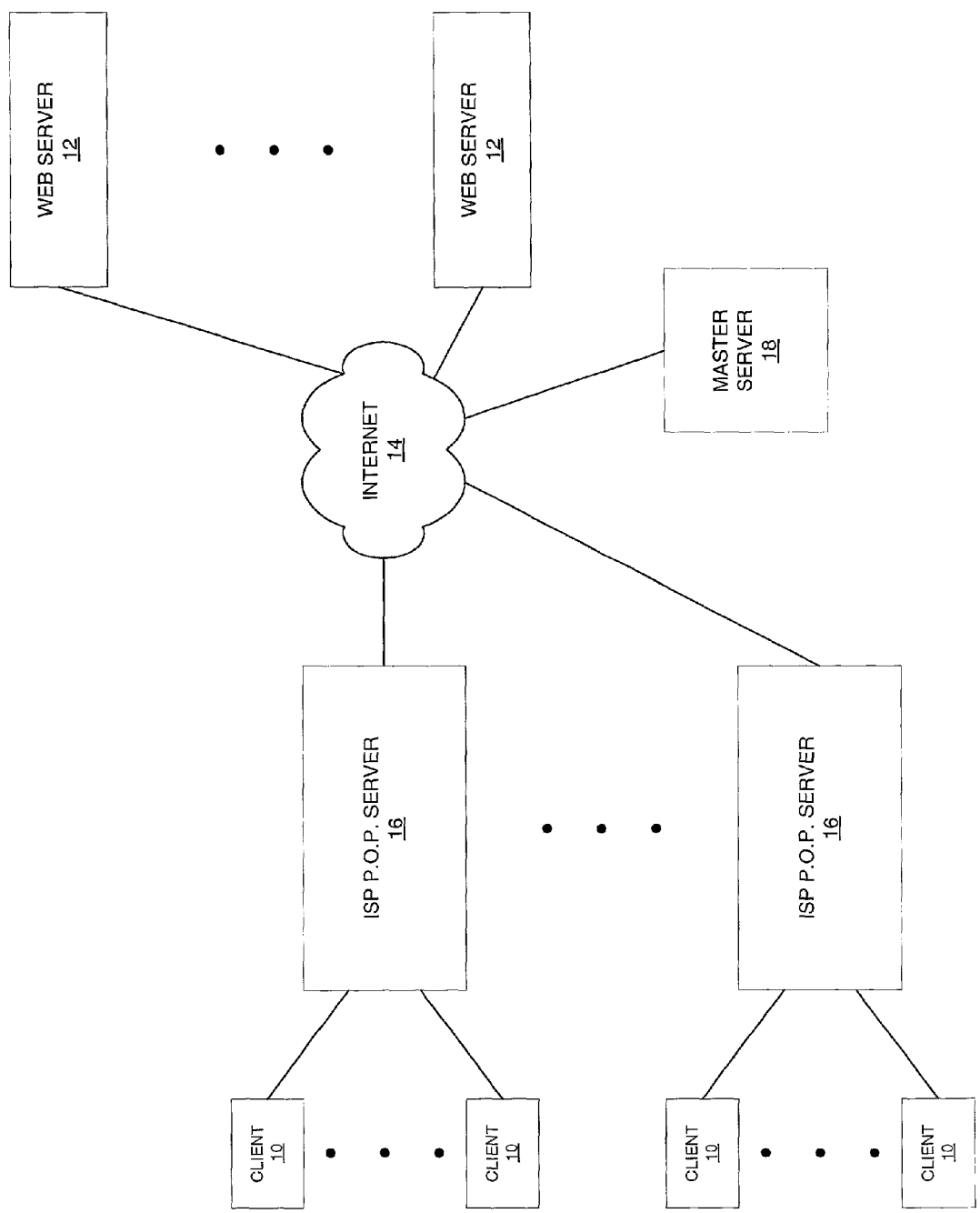
FIG. 1 is a block diagram illustrating a representative network in which the invention can be implemented.

FIG. 1 shows a representative network in which the inventive prediction system can be implemented. The network includes a plurality of client machines 10 operated by various individual users. The client machines 10 connect to multiple servers 12 via a communication channel 14, e.g., the Internet. In the case of the Internet, the servers 12 are known as web servers and they are selectively accessible by various clients. The web servers 12 support so-called "web sites" that consist of one or more "pages", i.e., files in various formats such as text, graphics, images, sound, video, etc. A network path to a web site generated by its associated web server is identified by a Uniform Resource Locator (URL).

One example of a client machine 10 is a personal computer, including a central processing unit (CPU), operating system and associated application programs, memory, input devices such as a keyboard and/or a mouse, and output devices, typically including a visual display unit. The screen of the display unit can be used to present a graphical user interface (GUI) by which the user interacts with the client machine, and in turn with the Internet network of servers, in a well-known manner.

Client machines 10 typically employ browsers, which are well-known software applications used to access the web servers 12, such as, for example, Netscape Navigator™ and Microsoft Internet Explorer™. Client machines 10 can access web servers 12 through an Internet service provider (ISP) such as, for example, America Online™. Illustrated in FIG. 1 are multiple ISP "point-of-presence" (POP) systems, each of which includes a POP server 16 linked to a group of client machines 10 for providing access to the Internet via the ISP's local area network. Each POP server 16 can accept URL page requests from one or more client machines 10, forward such requests to the Internet for accessing the requested URLs and distribute targeted informational content back to the users of such client machines. In addition, each POP server can facilitate the creation of a record of all such URL page requests for analysis in accordance with the teachings of the present invention.

The prediction system further includes a remote master server 18 linked to each POP server 16, preferably through the Internet 14. The computer software used to implement this preferred embodiment can be resident on the master server 18 (as in the FIG. 2 example described below), on the various POP servers 16, on the various client machines 10, or on a combination of these entities; such software can be distributed from the master server 18 to, and installed on, the POP servers 16 and the client machines 10 via the Internet 14, in a conventional manner. Instructions for predicting the behavior of a current user of an interactive service may be stored on a computer-readable medium.

Figure 2:
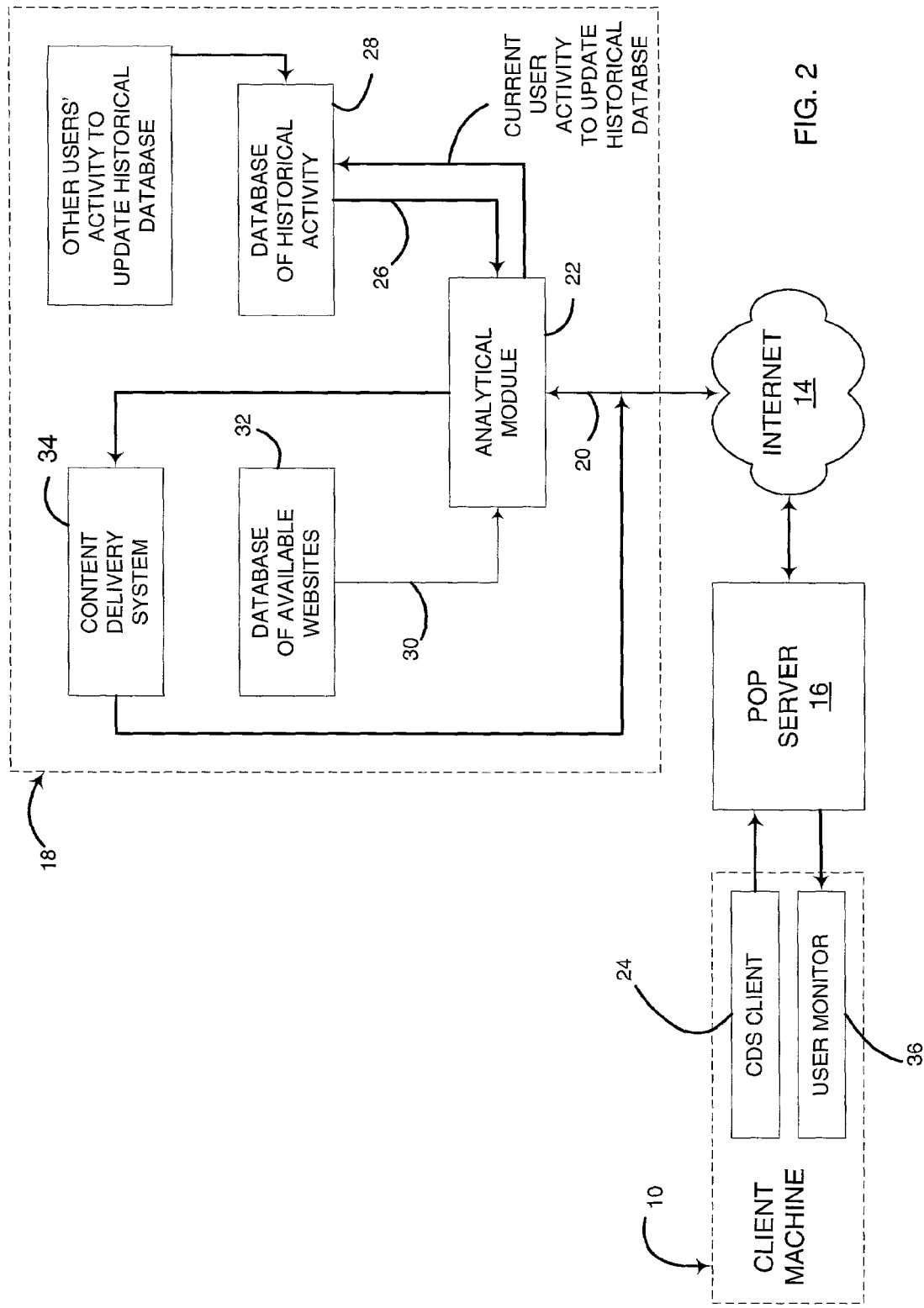
FIG. 2 is a block diagram illustrating the functional components of a behavior-predicting system configured in accordance with an embodiment of the present invention.

FIG. 2 illustrates in greater detail the functional components of a particular embodiment of a prediction system in accordance with the present invention. (For simplicity, only a single client machine 10 and its associated POP server 16 are shown.) A data stream 20 associated with a particular current user whose activities are being monitored and who is a potential recipient of some targeted informational content, is input via the POP server into an Analytical Module (AM) 22 operative on the Master Server 18. This data stream 20 contains (a) the URLs requested by the current user and therefore the associated web sites that such user has elected to visit during his/her current web-surfing session, and (b) the amount of time that the user has spent investigating each web site. This data stream is supplied by a software routine contained within a Content Delivery System (CDS) software client 24 installed in the client machine that detects the key strokes, mouse clicks or other inputs generated by the user during a visit to a particular web site or to communicate the user's desire to visit another web site. (The CDS software client 24 works in conjunction with a Content Delivery System 34 described later in connection with FIG. 2.) Alternatively, this data stream could be supplied by any one of various conventionally known technologies that reside on, or otherwise interface with, each client machine 10 to monitor a user's on-line activity, e.g., "cookies".

A second data stream 26 is provided to the AM 22 from a database 28 that contains files reflecting the historical activities of many other visitors to web sites, whether those web sites have been accessed via the ISP in question or via another ISP. Each such data file contains information that in some way identifies the corresponding user, usually by an anonymous identification number as well as by generic characteristics or attributes associated with that individual, e.g., age, gender, occupation, city or state of residence, amount of income, family size, etc. This second data stream also contains information reflecting the various types of web sites that have been visited by the other users as well as the amount of time spent at each type of web site. Generally, this information would have been compiled from an analysis of these users' click stream data, in a manner such as is described in the previously mentioned U.S. patent application Ser. No. 09/558,755. Alternatively, some of this information could have been obtained by a voluntarily disclosure by the other users, e.g., by filling out an on-line questionnaire in order for those users to obtain certain privileges or benefits from the ISP or from the operator of a particular web site.

Finally, the second data stream contains information in the form of behavioral patterns, trends or preferences exhibited by prior users that share one or more attributes or groupings of attributes, derived from a conventional statistical analysis of all the compiled raw data on prior user attributes, types of web sites visited and time duration of visits. For example, based on a statistical analysis of the web-surfing patterns of millions of users (whether via this particular ISP or other ISPs), it might be determined that the vast majority of over-50 males living in the New England states and having an annual income exceeding $100,000, who visit a travel-oriented web site for more than ninety seconds during a particular on-line session will also visit a web site that offers books for sale and will stay at that subsequent web site for an average of 3.5 minutes.

Naturally, the larger the amount of data collected about other users, both as to the number of users and the amount of data per user, the more detailed the behavioral patterns that can be discerned and the more accurate predictions that can be successfully made by the present invention. Therefore, the database 28 and consequently the second data stream 26 are continually updated to reflect ongoing visits to web sites by other users, or even visits by newly added users, contemporaneous with the current user conducting his/her present on-line session.

It should be pointed out that although the database 28 has been characterized as containing data reflecting the activities of other users, it also could contain data reflecting certain previous activities of the user who currently is being observed, and whose behavior is being predicted. For example, even though the current user may be visiting a particular web site (or type of web site) for the first time, and therefore that web site has no specific knowledge of that user's past activities and/or behavioral patterns, nevertheless there could be considerable accumulated data on that user's activities and behavioral patterns derived from an observation of his/her activities at other web sites (or types of web sites), or even in other environments or settings separate from the Internet. If that type of data is available and accessible, then the invention could make effective use of that data in performing its predictive functions.

Also, it would be particularly advantageous to have included in the first data stream 20 information that identifies the personal attributes of the user being observed (e.g., age, gender, occupation, etc.), to the extent that such information has been previously inferred or compiled for that user or can be gathered during the on-line session being observed.

The AM 22 compares the contents of the two data streams 20, 26 to identify points of similarity between (a) the on-line activities of the current user being observed, i.e., the web sites (or types of sites) visited by that user and the time spent at each, and (b) the web sites (or types of web sites) visited by the other users and the average time spent at each. (Clearly, if the data stream 20 also contains information indicative of the personal attributes of the current user, this information will be factored into the identification of points of similarity.) Based on the existence of a discernible behavioral pattern exhibited by multiple "similar" users, i.e., users who had visited the same sites (or types of sites) for comparable amounts of time, the AM 22 is able to generate an output that attributes to the current user this same behavioral pattern.

The determination of a likely behavioral pattern can be facilitated by the addition of an optional third stream of data that identifies, and distinguishes between, all possible activities in which the current user can choose to participate. A particularly useful way of doing so within the context of the described Internet-based on-line transactions, is to provide to the AM 22 a third data stream 30 from a database 32 that identifies all the separately identifiable Internet web sites, categorized by common subject matter according to a predetermined set of criteria, that are available to the typical user of the given ISP. Then, the AM 22 selects those sites that the current user is most likely to visit during the present on-line session, based on his/her similarity to prior users that visited those same sites, and generates an output indicative of those selected sites.

The output of the AM 22 is delivered to a content delivery system (CDS) 34 that is configured to permit the web site to deliver advertisements or other informational content to visitors to that web site; an example of such a CDS is described in U.S. patent application Ser. No. 09/558,755. Although the CDS 34 is shown as being resident on the master server 18 that supports the other components of the present invention, the invention would still function effectively if the CDS 34 were resident elsewhere, e.g., on the web server 12 that supports the operation of the particular web site being visited. In other words, the CDS could be one that is integrated with the other components of the invention in a "stand-alone" system and that is linked to, and accessible by, multiple web sites, or it could be one whose use is dedicated exclusively to a single web site. Based on well-known operations research and yield management techniques, the CDS 34 selects the most appropriate informational content (i.e., appropriate in light either of the pattern of behavior attributed to the current user or of the types of web sites deemed most likely to be visited) that is currently available to the CDS 34, for delivery to the current user and presentation at his/her client machine 10 via the CDS software client 24 installed in the client machine. Thus, for example, knowing that the current user has a greater than 50% chance of visiting certain categories of web sites within the next several minutes would permit the CDS 34 to choose a banner advertisement or other informational message from its current inventory that is most closely aligned with the interests served by such web sites. These messages then can be delivered to the present user in light of his/her anticipated behavior or preferences. Alternatively, the CDS 34 could direct the current user to the actual web sites that have been identified as most likely to be compatible with that user's preferences.

It should be pointed out that even if the database 28 showing the historical activities of other users were to be empty, or if for some reason the second data stream 26 should be unavailable, the present invention would still be able to operate. As the current user participates in activities in real time during his/her current on-line session, i.e., visits various web sites, this cumulative activity can be captured by the CDS software client 24. At the same time, CDS software clients 24 on multiple other client machines 10 can capture the contemporaneous activities of other Internet web surfers, to identify the sites or types of sites that they are visiting in parallel with the current user's visits. Data reflecting all this activity can be used to populate database 28 and so create that an ad hoc historical archive. Until some critical mass is achieved, i.e., until there is a sufficient amount of data to support a credible determination of behavioral patterns for the current user, informational content would be delivered according to some generic default criteria previously established for the CDS 34. However, as time passes, the ad hoc historical archive would become sufficiently detailed to permit the generation of the second data stream 26.

Figure 3:
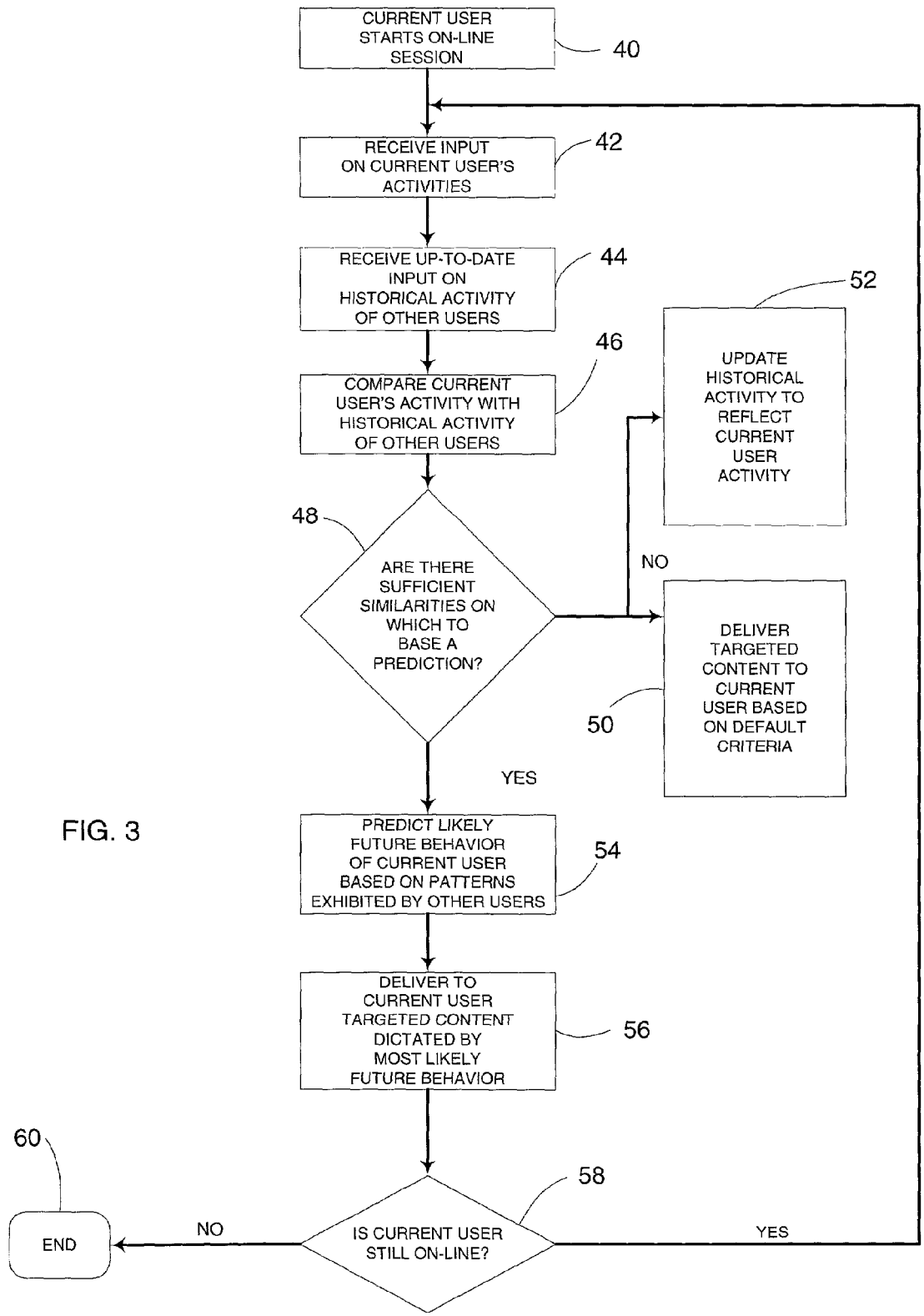
FIG. 3 is a flow diagram illustrating typical operation of a system configured in accordance with an embodiment of the present invention.

The flow chart of FIG. 3 demonstrates the sequence of events in the operation of the preferred embodiment of the present invention. At step 40, a determination is made that a particular user has initiated an on-line session that is to be monitored. At step 42 the collection of data indicative of that user's online activities is initiated, and at step 44 the data stream reflecting (a) the cumulative activities and attendant conditions, and (b) the behavioral patterns of the other users is received. Step 46 compares the current user's activities with those of the other users. If, from a probability and statistical perspective, step 48 determines that there is not a sufficient number of similarities (based on predetermined criteria) to support a meaningful prediction of the current user's behavior, then no prediction will be made. However, at step 50 it is possible nevertheless to deliver targeted informational content to the current user based on predetermined criteria unrelated to the present situation, and at step 52 to add data reflecting the current user's activities to the database of historical activity so that over time, in combination with data reflecting the activities of other users, step 48 will yield sufficient similarities on which to base a meaningful prediction.

If, on the other hand, step 48 initially yields sufficient similarities to justify a prediction, then at step 54 a pattern of behavior is attributed to the current user that is consistent with the patterns of behavior previously input at step 44. Thereupon, at step 56 target informational content can be delivered to the current user (either directly or, e.g., via a web site that the user is visiting) in accordance with the attributed pattern of behavior. Finally, if step 58 determines that the current user is still involved in his/her on-line session, then the process can resume at step 42, but this time using a more recently updated historical activity input. Otherwise, the prediction activity with respect to the current user is terminated at step 60.

Figure 4:
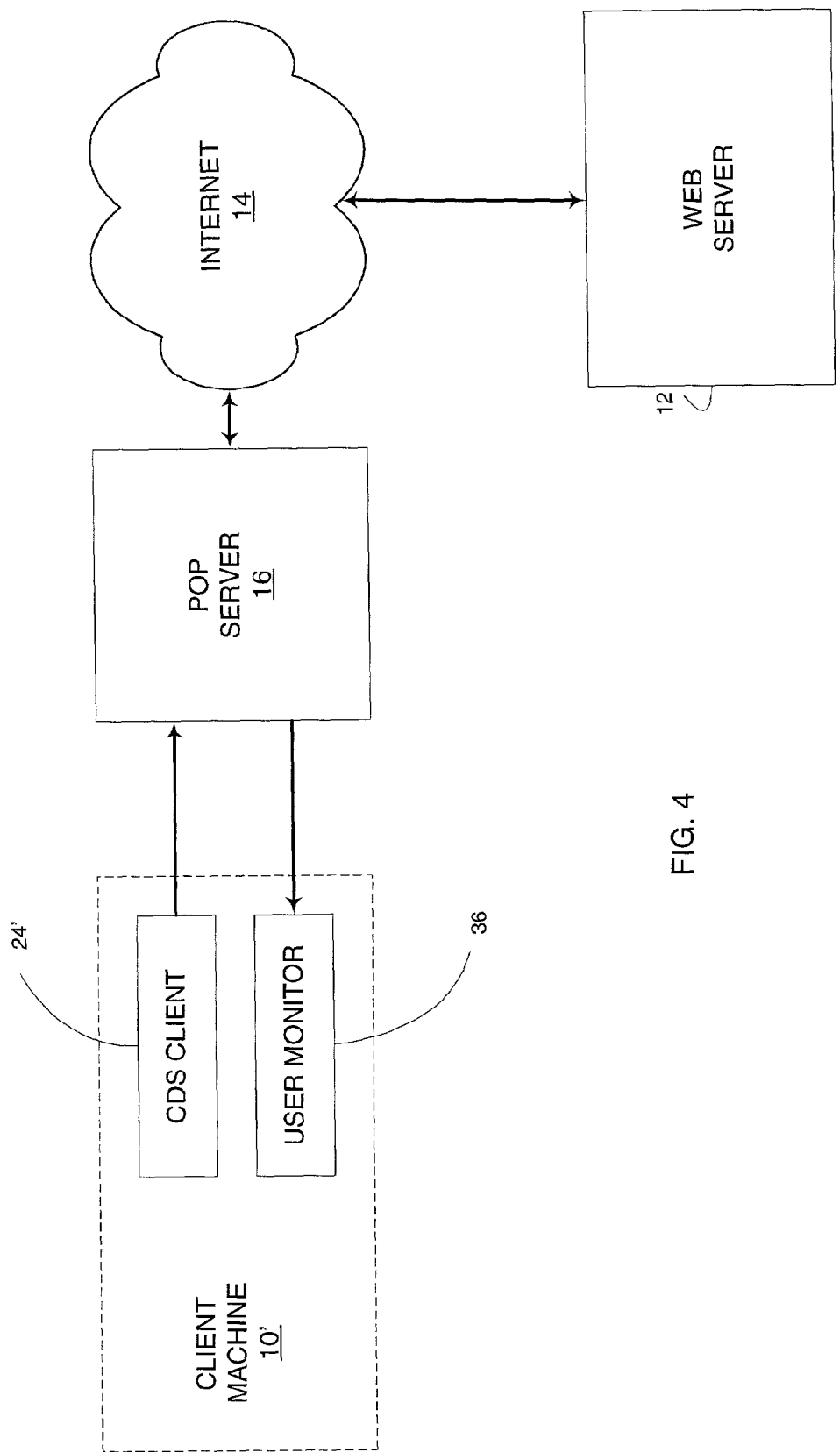
FIG. 4 is a block diagram illustrating the functional components of a behavior-predicting system in accordance with an alternative embodiment.

As illustrated in FIG. 4, in accordance with an alternate embodiment of the invention, user behavioral and preference information is developed and stored on the client machine 10' itself rather than on the master server 18 as in previously described embodiments. In accordance with the FIG. 4 embodiment, a CDS client 24' determines user behavioral or preference information by analyzing the online activities of the user including, for example, (a) the URLs requested by the user and (b) the amount of time that the user has spent investigating requested web sites. These activities are analyzed in connection with generally known data on profiles of visitors at particular web sites. The user behavioral or preference information is sent by the client machine 10' via the POP server 16 directly to a web site being visited using, for example, cookies. The web site can then dynamically customize content to the delivered to the user.

Although the present invention has been presented in the context of an Internet-based interactive transaction, it can operate just as effectively in other environments. For example, the client machines 10 could be replaced by television receivers configured with set-top boxes or comparable devices, whether fully interactive or not, that permit some degree of two-way communications between a television viewer and a television system head end, and whether connected by land-based cables, by a satellite hook-up or by other means. Such devices typically include a mechanism for identifying a television viewer by some unique designator (e.g., by the set top box serial number) and for collecting information corresponding to his/her channel selections. This compiled information on channel-viewing activity then can be processed in accordance with the teachings of the present invention. In the case of a fully interactive television system, other activities in which the viewer engages, in addition to merely watching television programs, can similarly be monitored and recorded for processing by the present invention.

Similarly, the client machines 10 could be replaced with any of a variety of consumer information appliances, i.e., individually addressable devices connectable to a network (either wired or wireless) that have a user interface and which are capable of storing and executing programs and of displaying information.

Also, although the disclosed embodiment has been shown as implemented in software operable on one or more computer systems, it could be effectively implemented in hardware components.

While specific embodiments of the invention have been described herein, it will be appreciated by those skilled in the art that other modifications and variations, including additions and subtractions, may be made to the disclosed invention without departing from its spirit and scope, and it is intended that such modifications remain within the scope of the following claims.

What is claimed is:

1. A method for predicting the behavior of a current user of an interactive television service, the method comprising:
    observing activity associated with a set top box of a current user engaging with the interactive television service;
    collecting the observed activity in a database;
    identifying, by the set top box, activities of the current user engaging with the interactive television service and conditions surrounding each of the identified activities of the current user, including amount of time the current user participated in each of the identified activities;
    accessing a first collection of data comprising data associated with:
        (i) cumulative activities associated with a set top box of other users,
        (ii) conditions surrounding the cumulative activities associated with a set top box of the other users, including amount of time that each other user participated in each respective activity, and
        (iii) patterns of behavior associated with the cumulative activities associated with a set top box of the other users and the conditions surrounding the cumulative activities associated with a set top box of the other users, wherein the cumulative activities include viewing interactive television programming;
    comparing the identified activities and the surrounding conditions associated with the identified activities of the current user with the cumulative activities and the surrounding conditions associated with the cumulative activities of the other users to identify similarities therebetween;
    identifying a pattern of behavior associated with the identified similarities between the identified activities and the surrounding conditions associated with the identified activities of the current user and the cumulative activities and the surrounding conditions associated with the cumulative activities of the other users; and
    attributing to the current user the identified pattern of behavior as a future behavior of the current user.

2. The method of claim 1, wherein the identifying step further comprises identifying personal attributes of the current user;
    the first collection of data further comprises data associated with personal attributes of the other users; and
    the comparing step further comprises comparing the personal attributes of the current user with the personal attributes of the other users to identify the similarities.

3. The method of claim 1, wherein the first collection of data is based on activities the other users participated while engaged with the interactive television service.

4. The method of claim 1, wherein the other users are unrelated individual persons.

5. The method of claim 1, wherein the other users are members of a group and the current user is identifiable as a potential member of that group.

6. The method of claim 1, further comprising the step of:
    periodically updating the first collection of data to reflect the other users' ongoing participation in additional activities.

7. The method of claim 6, wherein the step of periodically updating occurs in real time, during the current user's engagement with the interactive television service.

8. The method of claim 1, further comprising:
    accessing a second collection of data comprising data associated with:
        (i) A plurality of activities available via the interactive television service and
        (ii) information about each of the plurality of available activities distinguishing the activity from others of the plurality of the available activities,
    wherein the step of attributing includes selecting, from the plurality of available activities and based on the second collection of data, one or more activities in which the current user is most likely to participate during the engagement with the interactive television service.

9. The method of claim 1, wherein:
    the interactive television service is accessed through the Internet,
    the activities of the current user and the cumulative activities of the other users include visits to Internet web sites, and
    the first collection of data further comprises data associated with:
        (i) An identity of each other user,
        (ii) types of Internet web sites that each other user has visited,
        (iii) content of each type of Internet web site visited by each other user, and
        (iv) Amount of time spent at each type of internet web site by each other user.

10. The method of claim 9, further comprising the step of:
    periodically updating the first collection of data to reflect the other users' visits to additional Internet web sites.

11. The method of claim 10, wherein the step of periodically updating occurs in real time, during the current user's engagement with the interactive television service.

12. The method of claim 9, further comprising:
    accessing a second collection of data comprising data associated with:
        (i) A plurality of types of Internet web sites available for the current user to visit and
        (ii) information about each type of the plurality of types of Internet web sites distinguishing the type from others of the plurality of types of Internet web sites,
    wherein the step of attributing includes selecting, from the plurality of Internet web sites, one or more types of Internet web sites which the current user is most likely to visit during the engagement with the interactive television service.

13. A method for predicting the behavior of a user of an interactive television service, during a particular period of engagement with the interactive television service, the method comprising:
    observing activity associated with a set top box of a user engaging with the interactive television service;
    collecting the observed activity in a database;
    identifying, by the set top box, activities in which the user participates during the period of engagement and conditions surrounding each of the identified activities of the user, including amount of time the current user participated in each of the identified activities;

identifying activities associated with a set top box of multiple other contemporaneous users of the interactive television service during the period of engagement and conditions surrounding the identified activities associated with the set top box of the other contemporaneous users, including amount of time that each other user participated in each respective activity, wherein the activities associated with the set top box of the other contemporaneous users include viewing interactive television programming;

maintaining a first collection of data comprising data associated with cumulative activities and surrounding conditions associated with the set top box of the user collected in the database and data associated with the set top box of the other contemporaneous users identified during the period of engagement;

determining, based on the first collection of data, patterns of behavior associated with the cumulative activities associated with a set top box of the other contemporaneous users and the conditions surrounding the cumulative activities associated with a set top box of the other contemporaneous users during the period of engagement;

incorporating into the first collection of data, data associated with the determined patterns of behavior;

comparing (i) The present activities and the surrounding conditions associated with the present activities of the user and (ii) The cumulative activities and the surrounding conditions associated with the cumulative activities of the other contemporaneous users to identify similarities therebetween;

identifying a pattern of behavior associated with the identified similarities between the present activities and the surrounding conditions associated with the present activities of the current user and the cumulative activities and the surrounding conditions associated with the cumulative activities of the other contemporaneous users; and attributing to the user the identified pattern of behavior as a future behavior of the current user.

14. The method of claim 13, further comprising:
continually updating the first collection of data to reflect participation of the user and the other contemporaneous users in additional activities and new patterns of behavior determined based on the participation of the user and the other contemporaneous users in additional activities,
wherein the steps of comparing and attributing are performed, at any given point in time, using the updated first collection of data.

15. The method of claim 14, further comprising:
accessing a second collection of data comprising data associated with:
(i) A plurality of activities that are available via the interactive television service and
(ii) information about each of the plurality of available activities distinguishing the activity from others of the plurality of available activities,
wherein the step of attributing further comprises selecting one or more of the plurality of available activities in which the user is most likely to participate during the period of engagement with the interactive television service.

16. The method of claim 14, wherein:
the interactive television service is accessed through the Internet,
the user and other contemporaneous users activities include visits to Internet web sites, and
the first collection of data includes data associated with
(i) types of Internet web sites that the user and the other contemporaneous users have visited,
(ii) content of each type of Internet web site visited, and
(iii) Amount of time spent at each type of Internet web site visited.

17. The method of claim 16, further comprising:
accessing a second collection of data comprising data associated with:
(i) A plurality of types of Internet web sites available for the user to visit and
(ii) information about each of the plurality of types distinguishing the type from others of the plurality of types,
wherein the step of attributing further comprises one or more of the plurality of types of web sites, which the current user is most likely to visit during the engagement with the interactive television service.

18. The method of claim 13, wherein the other users are members of a group and the current user is identifiable as a potential member of that group.

19. The method of claim 13, further comprising the step of:
periodically updating the first collection of data to reflect the other users' ongoing participation in additional activities.

20. The method of claim 19, wherein the step of periodically updating occurs in real time, during the current user's engagement with the interactive television service.

21. The method of claim 13, wherein:
the interactive television service is accessed through the Internet,
the activities of the current user and the cumulative activities of the other users include visits to Internet web sites, and
the first collection of data further comprises data associated with:
(i) An identity of each other user,
(ii) types of Internet web sites that each other user has visited,
(iii) content of each type of Internet web site visited by each other user, and
(iv) Amount of time spent at each type of Internet web site by each other user.

22. A non-transitory computer-readable medium having stored thereon instructions for predicting the behavior of a current user of an interactive television service which, when executed by a processor, cause the processor to perform the steps of:
observing activity associated with a set top box of a current user engaging with the interactive television service;
collecting the observed activity in a database;
identifying, by the set top box, activities of the current user engaging with the interactive television service and conditions surrounding each of the identified activities of the current user, including amount of time the current user participated in each of the identified activities;
accessing a first collection of data comprising data associated with:
(i) cumulative activities associated with a set top box of other users,
(ii) conditions surrounding the cumulative activities associated with a set top box of the other users, including amount of time that each other user participated in each respective activity, and
(iii) patterns of behavior associated with the cumulative activities associated with a set top box of the other users and the conditions surrounding the cumulative activities associated with a set top box of the other users, wherein the cumulative activities include viewing interactive television programming;

comparing the identified activities and the surrounding conditions associated with the identified activities of the current user with the cumulative activities and the surrounding conditions associated with the cumulative activities of the other users to identify similarities therebetween;

identifying a pattern of behavior associated with the identified similarities between the identified activities and the surrounding conditions associated with the identified activities of the current user and the cumulative activities and the surrounding conditions associated with the cumulative activities of the other users; and attributing to the current user the identified pattern of behavior as a future behavior of the current user.

23. The non-transitory computer-readable medium of claim 22, wherein the identifying step further comprises identifying personal attributes of the current user;

the first collection of data further comprises data associated with personal attributes of the other users; and the comparing step further comprises comparing the personal attributes of the current user with the personal attributes of the other users to identify the similarities.

24. The non-transitory computer-readable medium of claim 22, wherein the first collection of data is based on activities the other users participated while engaged with the interactive television service.

25. The non-transitory computer-readable medium of claim 22, having stored thereon further instructions which, when executed by the processor, cause the processor to perform the step of:

periodically updating the first collection of data to reflect the other users' ongoing participation in additional activities.

26. The non-transitory computer-readable medium of claim 25, wherein the instructions that cause the processor to perform the step of periodically updating cause it to do so in real time, during the current user's engagement with the interactive television service.

27. The non-transitory computer-readable medium of claim 22, having stored thereon further instructions which, when executed by the processor, cause the processor to perform the step of:

accessing a second collection of data comprising data associated with:
(i) A plurality of activities that are available via the interactive television service and
(ii) information about each of the plurality of available activities distinguishing the activity from others of the plurality of the available activities, wherein the step of attributing includes selecting, from the plurality of available activities and based on the second collection of data, one or more activities in which the current user is most likely to participate during the engagement with the interactive television service.

28. The non-transitory computer-readable medium of claim 22, wherein:

the interactive television service is accessed through the Internet, the activities of the current user m and the cumulative activities of the other users include visits to Internet web sites, and the first collection of data further comprises data associated with:
(i) An identity of each other user,
(ii) types of Internet web sites that each other user has visited,
(iii) content of each type of Internet web site visited by each other user, and
(iv) Amount of time spent at each type of Internet web site by each other user.

29. An apparatus for predicting the behavior of a current user of an interactive television service, comprising:

means for observing activity associated with a set top box of a current user engaging with the interactive television service;

means for collecting the observed activity in a database;

means for identifying activities of the current user engaging with the interactive television service and conditions surrounding each of the identified activities, including amount of time the current user participated in each of the identified activities;

means for accessing a first collection of data comprising data associated with:
(i) cumulative activities associated with a set top box of other users,
(ii) conditions surrounding the cumulative activities associated with a set top box of the other users, including amount of time that each other user participated in each respective activity, and
(iii) patterns of behavior associated with the cumulative activities associated with a set top box of the other users and the conditions surrounding the cumulative activities associated with a set top box of the other users, wherein the cumulative activities include viewing interactive television programming;

means for comparing the identified activities and the surrounding conditions associated with the identified activities of the current user with the cumulative activities and the surrounding conditions associated with the cumulative activities of the other users to identify similarities therebetween;

means for identifying a pattern of behavior associated with the identified similarities between the identified activities and the surrounding conditions associated with the identified activities of the current user and the cumulative activities and the surrounding conditions associated with the cumulative activities of the other users; and means for attributing to the current user the identified pattern of behavior as a future behavior of the current user.

30. The apparatus of claim 29, wherein:

the means for identifying the conditions surrounding each of the identified activities further comprises means for identifying personal attributes of the current user;

the first collection of data further comprises data associated with personal attributes of the other users; and means for comparing further comprises means for comparing the personal attributes of the current user with the personal attributes of the other users to identify the similarities.

31. The apparatus of claim 29, wherein the first collection of data is based on activities the other users participated while engaged with the interactive television service.

32. The apparatus of claim 29, wherein the other users are unrelated individual persons.

33. The apparatus of claim 29, wherein the other users are members of a group and the current user is identifiable as a potential member of that group.

34. The apparatus of claim 29, further comprising:
means for periodically updating the first collection of data to reflect the other users' ongoing participation in additional activities.

35. The apparatus of claim 34, wherein the means for periodically updating operates in real time, during the current user's engagement with the interactive television service.

36. The apparatus of claim 29, further comprising:
means for accessing a second collection of data comprising data associated with:
   (i) A plurality of activities that are available via the interactive television service and
   (ii) information about each of the plurality of available activities distinguishing the activity from others of the plurality of the available activities,
wherein the means for attributing includes means for selecting, from the plurality of available activities and based on the second collection of data, one or more activities in which the current user is most likely to participate during the engagement with the interactive television service.

37. The apparatus of claim 29, wherein:
the interactive television service is accessed through the Internet,
the activities of the current user and the cumulative activities of the other users include visits to Internet web sites, and
the first collection of data further comprises data associated with:
   (i) An identity of each other user,
   (ii) types of Internet web sites that each other user has visited,
   (iii) content of each type of Internet web site visited by each other user, and
   (iv) Amount of time spent at each type of Internet web site by each other user.

* * * * *

UNITED STATES PATENT AND TRADEMARK OFFICE
CERTIFICATE OF CORRECTION

PATENT NO.         : 7,822,843 B2
APPLICATION NO.    : 09/928493
DATED              : October 26, 2010
INVENTOR(S)        : Perdon et al.

It is certified that error appears in the above-identified patent and that said Letters Patent is hereby corrected as shown below:

Col. 9, line 61, claim 3: "other users participated while" should read --other users participated in while--

Col. 13, line 29, claim 24: "other users participated while" should read --other users participated in while--

Col. 13, line 65, claim 28: "current user m and the cumulative" should read --current user and the cumulative--

Col. 14, line 61, claim 31: "other users participated while" should read --other users participated in while--

Signed and Sealed this
Thirteenth Day of March, 2012

David J. Kappos
*Director of the United States Patent and Trademark Office*